(12) United States Patent
Gayaka et al.

(10) Patent No.: US 9,147,418 B1
(45) Date of Patent: Sep. 29, 2015

(54) DISK DRIVE COMPENSATING FOR MICROACTUATOR GAIN VARIATIONS

(71) Applicant: Western Digital Technologies, Inc., Irvine, CA (US)

(72) Inventors: Shreekant Gayaka, Sunnyvale, CA (US); Min Chen, San Jose, CA (US); Young-Hoon Kim, Cupertino, CA (US); Wei Xi, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/923,024

(22) Filed: Jun. 20, 2013

(51) Int. Cl.
| | |
|---|---|
| *G11B 5/596* | (2006.01) |
| *G11B 5/56* | (2006.01) |
| *G11B 5/55* | (2006.01) |
| *G11B 5/58* | (2006.01) |
| *G11B 5/54* | (2006.01) |
| *G11B 21/10* | (2006.01) |

(52) U.S. Cl.
CPC .. *G11B 5/56* (2013.01); *G11B 5/54* (2013.01); *G11B 5/556* (2013.01); *G11B 5/5521* (2013.01); *G11B 5/58* (2013.01); *G11B 5/596* (2013.01); *G11B 21/106* (2013.01)

(58) Field of Classification Search
None
See application file for complete search history.

(56) References Cited

U.S. PATENT DOCUMENTS

| | | | |
|---|---|---|---|
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,058 A | 8/2000 | Morris | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |

(Continued)

OTHER PUBLICATIONS

Shreekant Gayaka, et al., U.S. Appl. No. 13/363,228, filed Jan. 31, 2012, 27 pages.

(Continued)

*Primary Examiner* — Andrew L Sniezek

(57) ABSTRACT

A disk drive is disclosed comprising a head, a disk surface comprising servo information, and a dual stage actuator (DSA) servo loop comprising a voice coil motor (VCM) servo loop comprising a VCM and a microactuator servo loop comprising a microactuator operable to actuate the head over the disk surface. A position error signal (PES) is generated based on the servo information, and a first control signal is generated based on the PES. The first control signal is adjusted based on a function of the first control signal to generate a second control signal that compensates for a gain variation of the microactuator, and the microactuator is controlled based on the second control signal.

18 Claims, 5 Drawing Sheets

(56) References Cited

U.S. PATENT DOCUMENTS

| | | | |
|---|---|---|---|
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,563,665 B1 | 5/2003 | Ell |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,741,417 B2 | 5/2004 | Hsin et al. |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,898,039 B2 * | 5/2005 | Kobayashi et al. ............. 360/60 |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,136,257 B2 | 11/2006 | Zhang et al. |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,283,321 B1 | 10/2007 | Sun et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,385,780 B2 | 6/2008 | Kim et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,423,837 B2 | 9/2008 | Hutsell |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |

(56) References Cited

U.S. PATENT DOCUMENTS

| | | |
|---|---|---|
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,474,496 B1 | 1/2009 | Sun et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,538,971 B2 | 5/2009 | Sun et al. |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,826,170 B2 | 11/2010 | Semba |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,869,157 B2 | 1/2011 | Nagashima et al. |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 * | 12/2013 | Xi et al. .................... 360/78.05 |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,780,489 B1 | 7/2014 | Gayaka et al. |
| 2002/0176201 A1* | 11/2002 | Hsin et al. .................. 360/78.05 |
| 2004/0228027 A1* | 11/2004 | Zhang et al. ............... 360/78.05 |
| 2006/0039079 A1* | 2/2006 | Kobayashi et al. ........ 360/78.05 |
| 2007/0253097 A1* | 11/2007 | Sun et al. .................... 360/78.04 |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2013/0188277 A1* | 7/2013 | Matsuzawa .................... 360/75 |

OTHER PUBLICATIONS

Alexander Babinski, et al., U.S. Appl. No. 12/606,819, filed Oct. 27, 2009, 22 pages.

* cited by examiner

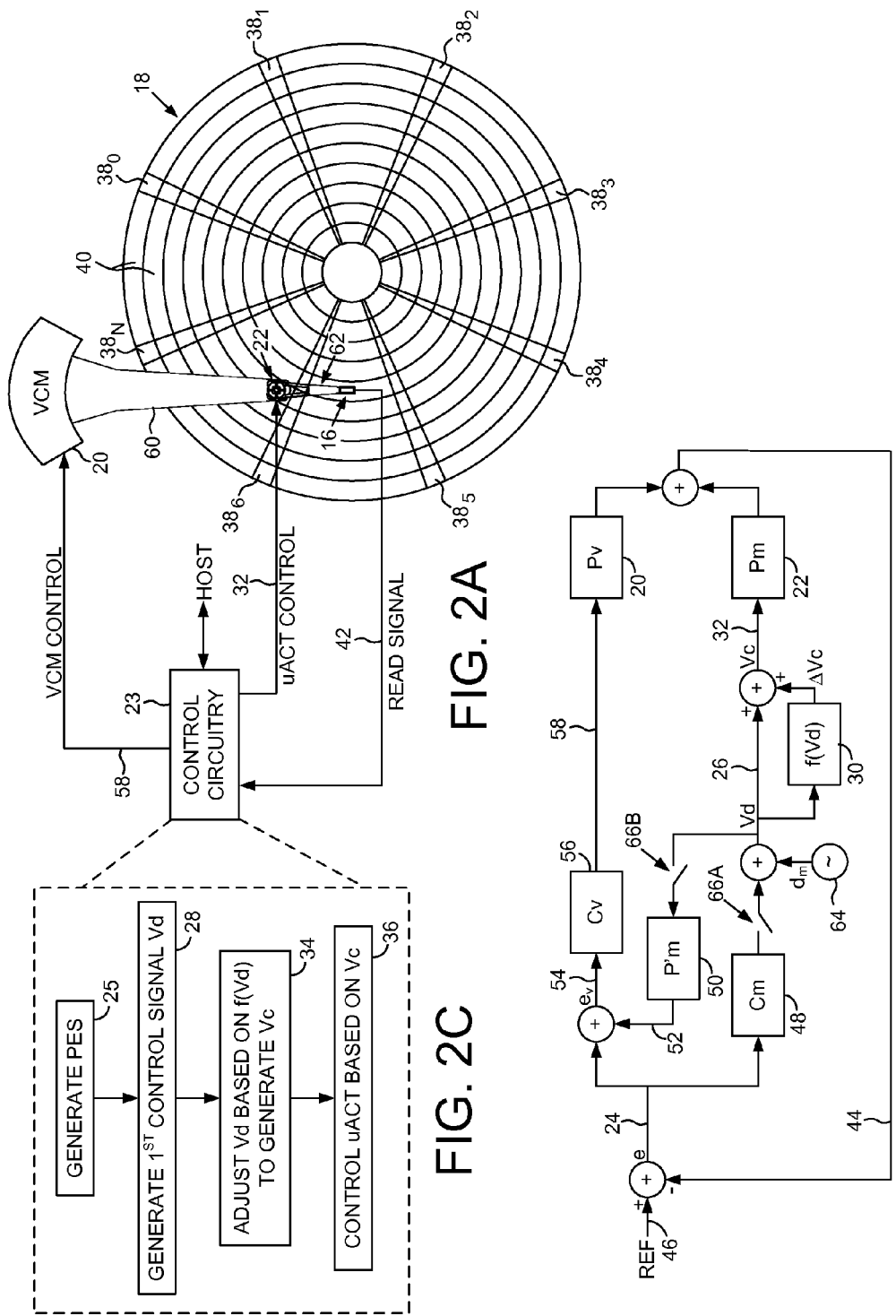

DISK DRIVE COMPENSATING FOR MICROACTUATOR GAIN VARIATIONS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., VCM) in order to actuate the head radially over the disk in a direction that reduces the PES.

As the density of the data tracks increases, a microactuator may be employed in combination with the VCM to improve the tracking performance of the servo system. Any suitable microactuator may be employed, such as a suitable piezoelectric (PZT) actuator. The microactuator may actuate the head over the disk in any suitable manner, such as by actuating a suspension relative to a distal end of an actuator arm, or by actuating a slider relative to the suspension.

BRIEF DESCRIPTION OF THE DRAWINGS

FIG. 2A shows a disk drive according to an embodiment comprising a head actuated over a disk by a voice coil motor (VCM) and a microactuator.

FIG. 2B shows a dual stage actuator (DSA) servo loop comprising a VCM servo loop and a microactuator servo loop.

FIG. 2C is a flow diagram according to an embodiment wherein a control signal applied to the microactuator is adjusted in order to linearize a response of the microactuator.

DETAILED DESCRIPTION

Figure 1:
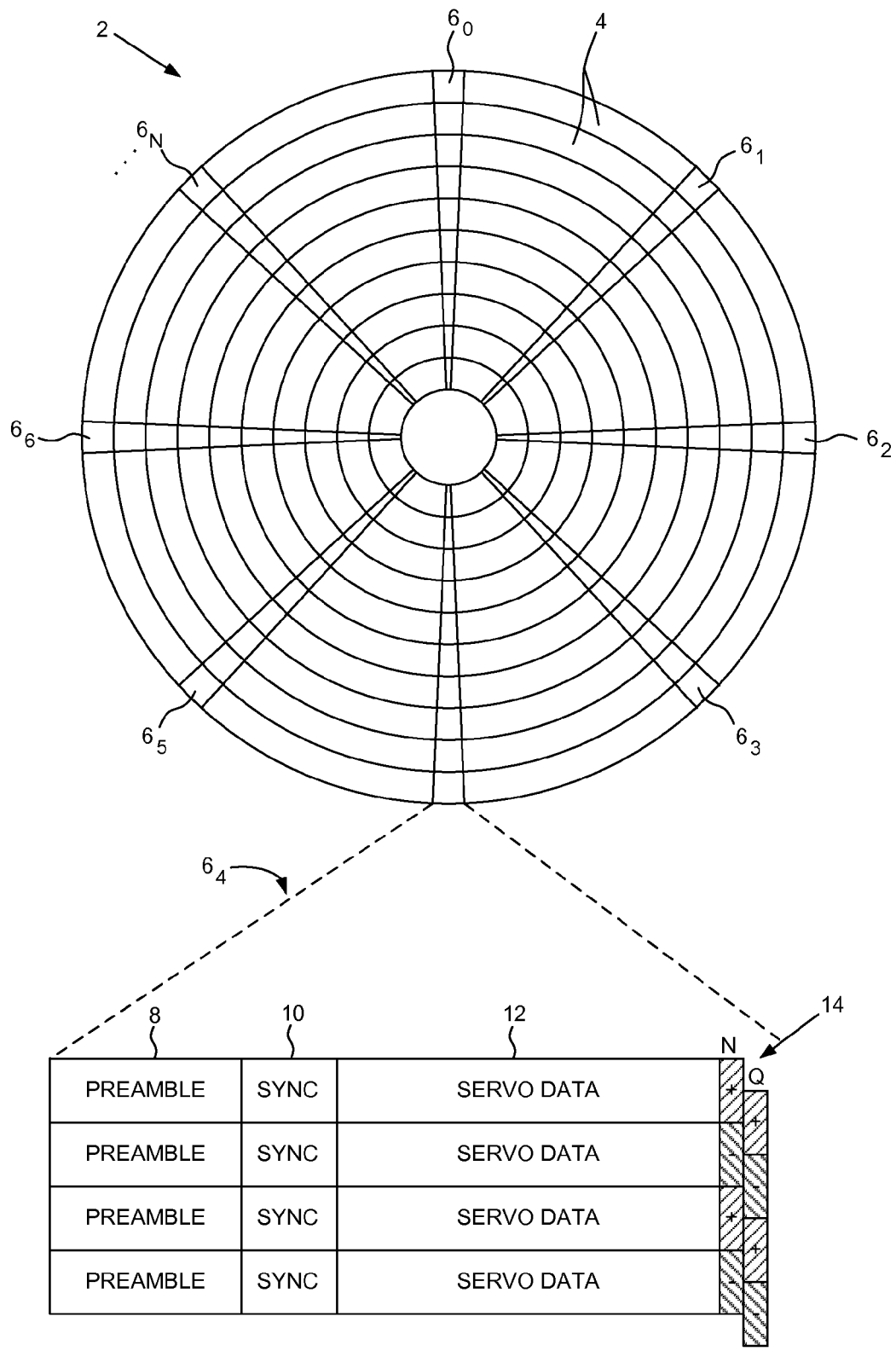
FIG. 1 shows a prior art disk format comprising a plurality of servo tracks defined by servo sectors.

FIG. 2A shows a disk drive according to an embodiment comprising a head 16, a disk surface 18 comprising servo information, and a dual stage actuator (DSA) servo loop (FIG. 2B) comprising a voice coil motor (VCM) servo loop comprising a VCM 20 and a microactuator servo loop comprising a microactuator 22 operable to actuate the head 16 over the disk surface 18. The disk drive further comprises control circuitry 23 operable to execute the flow diagram of FIG. 2C, wherein a position error signal (PES) 24 is generated based on the servo information (block 25), and a first control signal 26 is generated based on the PES (block 28). The first control signal 26 is adjusted based on a function 30 of the first control signal 26 to generate a second control signal 32 that compensates for a gain variation of the microactuator (block 34), and the microactuator 22 is controlled based on the second control signal 32 (block 36).

In the embodiment of FIG. 2A, the disk surface 18 comprises embedded servo sectors $38_0$-$38_N$ that define a plurality of servo tracks 40, wherein data tracks are defined relative to the servo tracks (at the same or different radial density). The control circuitry 23 process a read signal 42 emanating from the head 16 to demodulate the servo sectors $38_0$-$38_N$ into an estimated position 44 (FIG. 2B). The estimated position 44 is subtracted from a reference position 46 to generate the PES 24 representing an error between the actual position of the head and a target position relative to a target track. The PES 24 is filtered by a microactuator compensator 48 to generate the first control signal 26. The first control signal 26 is applied to a model of the microactuator 50 to generate a compensation signal 52. A VCM error signal 54 of the VCM servo loop is generated based on the PES 24 and the compensation signal 52. The VCM error signal 54 is applied to a VCM compensator 56 to generate a VCM control signal 58 applied to a voice coil motor (VCM) 20 which rotates an actuator arm 60 about a pivot. The servo sectors $38_0$-$38_N$ may comprise any suitable position information, such as a track address for coarse positioning and servo bursts for fine positioning. The servo bursts may comprise any suitable pattern, such as an amplitude-based servo pattern or a suitable phase-based servo pattern (e.g., FIG. 1).

Figure 3A:
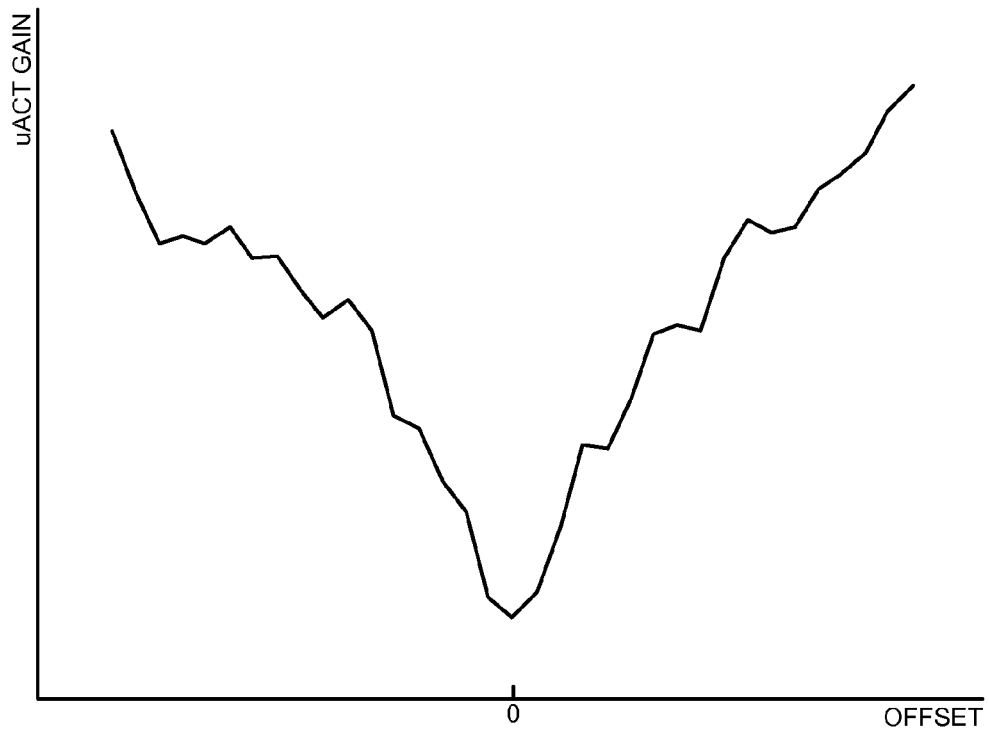
FIG. 3A illustrates an example of microactuator gain variation due to a magnitude of the microactuator control signal.
Figure 3B:
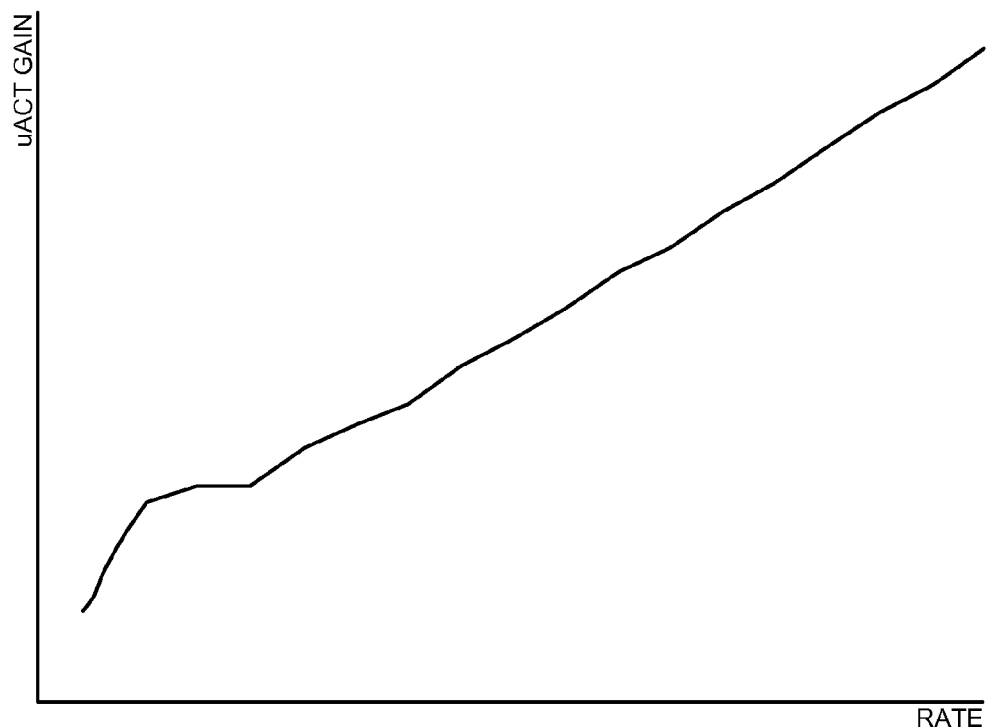
FIG. 3B illustrates an example of microactuator gain variation due to a derivative of the microactuator control signal.

Any suitable microactuator 22 may be employed, such as a suitable piezoelectric microactuator. Further, the microactuator 22 may actuate the head 16 over the disk surface 18 in any suitable manner, such as by actuating a suspension 62 relative to the actuator arm 60 as in FIG. 2A, or by actuating a slider relative to the suspension 62. In one embodiment, a gain of the microactuator 22 may vary based on a magnitude of the first control signal 26 and/or a derivative of the first control signal 26, thereby causing the microactuator 22 to exhibit a nonlinear response. This is illustrated in FIG. 3A which shows an example of how the gain of the microactuator may vary as the offset of the head changes due to the magnitude of the first control signal 26 changing. FIG. 3B shows an example of how the gain of the microactuator 22 may vary as the derivative (rate) of the first control signal 26 changes. Accordingly, in one embodiment the first control signal 26 is adjusted as a function 30 of the first control signal 26 in order to compensate for the gain variation of the microactuator 22, thereby linearizing the response of the microactuator 22.

In one embodiment, the control circuitry 23 is operable to measure the gain variations of the microactuator 22 relative to the magnitude and/or derivative of the first control signal 26, and then configure the function 30 in FIG. 2B based on the measurements. The control circuitry 23 may measure the gain variations of the microactuator 22 in any suitable manner, wherein in one embodiment shown in FIG. 2B, the control circuitry 23 is operable to inject a disturbance signal 64 into the microactuator servo loop. In one embodiment, the disturbance signal 64 comprises an offset and at least one sinusoid, such as a disturbance signal 64 of the form:

$$d_m = v_o + \epsilon \sin(\omega t)$$

where $v_o$ represents the offset, and $\epsilon \sin(\omega t)$ is a suitable sinusoid, and the derivative of the above equation is:

$$d_m' = \epsilon \omega \cos(\omega t).$$

In one embodiment, in order to measure the gain of the microactuator 22 the control circuitry 23 opens switches 66A and 66B in FIG. 2B to disable the microactuator servo loop, and then measures a response of the VCM servo loop to the disturbance signal 64. For example, the control circuitry 23 may evaluate the VCM error signal 54 at the frequency $\omega$ of the disturbance signal 64. In another embodiment, the control circuitry 23 may generate a feed-forward compensation signal that cancels the effect of the disturbance signal 64 on the VCM servo loop, wherein a magnitude of the feed-forward compensation signal represents the gain of the microactuator 22.

In one embodiment, the gain variation of the microactuator 22 is measured relative to the magnitude of the control signal as shown in FIG. 3A, and the gain variation is measured relative to the derivative of the first control signal as shown in FIG. 3B. In one embodiment, the gain variation relative to the magnitude of the control signal may be measured by setting the amplitude $\epsilon$ of the sinusoid in the disturbance signal 64 to a small value, and then measuring the gain of the microactuator while sweeping the offset $v_o$ over positive and negative values. The gain variation relative to the derivative of the control signal may be measured by setting the amplitude offset $v_o$ in the disturbance signal 64 to zero, and then measuring the gain of the microactuator while sweeping the amplitude $\epsilon$ of the sinusoid from zero to a predetermined maximum.

In one embodiment, the measurements shown in FIG. 3A may be curve fitted to a polynomial represented by:

$$G = f(v_c, v_c') = \alpha_1(v_c') + \alpha_2 v_c + \alpha_3 v_c^2 + \ldots + \alpha_m v_c^m \quad (1)$$

where $v_c$ represents the control signal 32 in FIG. 2B applied to the microactuator (the disturbance signal $d_m$ with the function 30 disabled), and $\alpha_1(v_c' = 0)$ represents the gain of the microactuator at zero offset in FIG. 3A. The function $\alpha_1(v_c')$ representing the gain variation relative to the derivative of the control signal may be generated by curve fitting the data in FIG. 3B to a polynomial represented by:

$$\alpha_1(v_c') = \phi_0 + \phi_1 v_c' + \phi_2 v_c'^2 + \ldots + \phi_n v_c'^m \quad (2)$$

where $\phi_0$ represents the gain of the microactuator at zero rate in FIG. 3B.

The displacement of the microactuator 22 may be estimated by integrating the above gain model:

$$Y = \int f(v_c, v_c') dv_c + \int f(v_c, v_c') dv_c' \approx \int f(v_c, v_c') dv_c$$

-continued
$$= \{\varphi_0 + \varphi_1 v_c' + \varphi_2 v_c'^2 + \ldots + \varphi_n v_c'^m\} v_c + \alpha_2 \frac{v_c^2}{2} + \alpha_3 \frac{v_c^3}{3} + \ldots + \alpha_m \frac{v_c^m}{m}$$

where the dependence of the displacement on the derivative of the control signal $dv_c'$ is ignored as small compared to the contribution due to the amplitude term $dv_c$. The gain of the microactuator 22 remains substantially constant relative to the first control signal 26 in FIG. 2B when the following equation holds:

$$G_{nom} v_d = \{\varphi_0 + \varphi_1 v_c' + \varphi_2 v_c'^2 + \ldots + \varphi_n v_c'^m\} v_c + \alpha_2 \frac{v_c^2}{2} + \alpha_3 \frac{v_c^3}{3} + \ldots + \alpha_m \frac{v_c^m}{m}$$

where $G_{nom}$ represents a target nominal gain for the microactuator 22.

The above equation cannot be solved due to the two-to-one mapping of variables:

$$F: (v_c, v_c') \rightarrow v_d$$

However, the solution can be approximated by quantizing the rate of the control signal $v_c'$, and assuming that between each quantized level the above equation represents the displacement of the microactuator with an acceptable level of error. In addition, the solution may be further simplified by assuming that:

$$v_c' \approx v_d';$$

so that the term:

$$\{\phi_0 + \phi_1 v_c' + \phi_2 v_c'^2 + \ldots + \phi_n v_c'^m\} v_c$$

may be treated as a known constant within each quantized level of the rate, and therefore the above equation reduces to a one-to-one mapping:

$$F: (v_c) \rightarrow v_d \Rightarrow F^{-1}: (v_d) \rightarrow v_c$$

The above inverse function may be approximated using a polynomial basis function:

$$v_c = \kappa_1 v_d + \kappa_2 v_d^2 + \ldots + \kappa_m v_d^m$$

Accordingly, for each quantized level of the rate of the control signal $v_d'$, a set of $(v_c, v_d)$ can be analytically generated to obtain $\{\kappa_i\}$. The function 30 in FIG. 2B may then generate the adjustment signal according to:

$$\Delta v_c = (\kappa_1 - 1) v_d + \kappa_2 v_d^2 + \ldots + \kappa_m v_d^m$$

Figure 5:
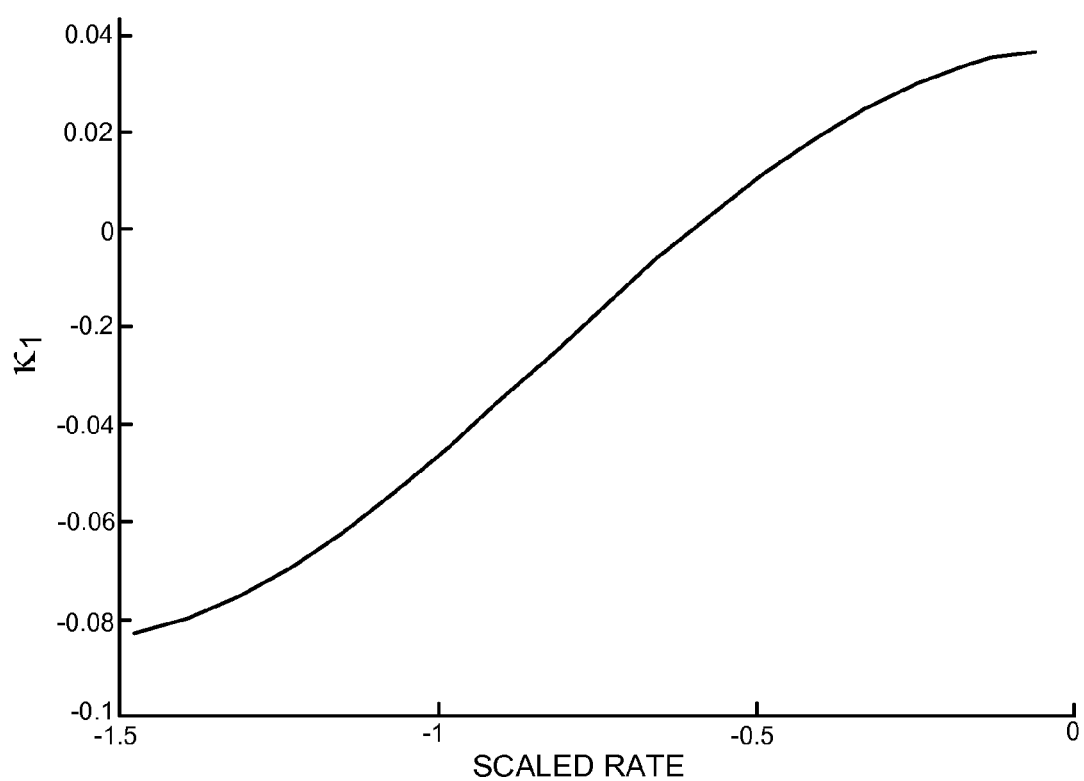
FIG. 5 illustrates an embodiment where the microactuator gain compensating function is generated by computing a coefficient using a polynomial function.

In one embodiment, the coefficients $\{\kappa_i\}$ may be generated using a lookup table indexed by the quantized level of the rate of the control signal $v_d'$. In another embodiment, each coefficient in $\{\kappa_i\}$ may be approximated by a polynomial function of the quantized level of the rate of the control signal $v_d'$. This is illustrated in FIG. 5 which shows an example of the first coefficient $\kappa_1$ in $\{\kappa_i\}$ versus the rate of the control signal $v_d'$ which can be curve fitted to a polynomial, the coefficients of which may be saved and used to compute the first coefficient $\kappa_1$ during normal operation. Similar polynomial functions may be generated and their coefficients stored to compute the remaining coefficients in $\{\kappa_i\}$ for each quantized level of the rate of the control signal $v_d'$.

Figure 4:
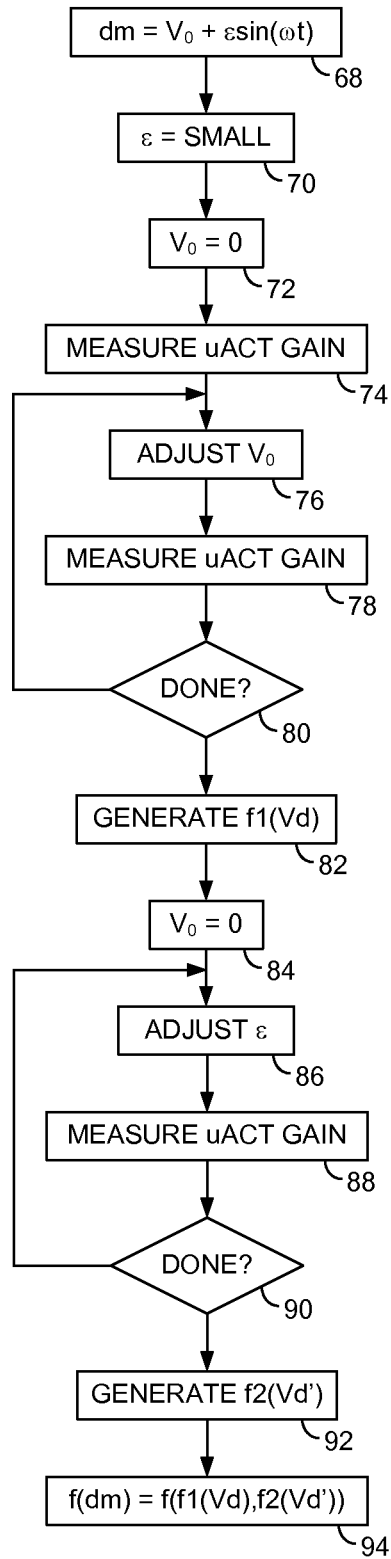
FIG. 4 is a flow diagram according to an embodiment wherein the gain variation of the microactuator is measured and the measurements used to generate a function that compensates for the gain variations in order to linearize the response of the microactuator.

FIG. 4 is a flow diagram according to the above-described embodiment for generating the function 30 of FIG. 2B, wherein a disturbance signal 64 comprising an offset and at least one sinusoid is injected into the microactuator servo loop (block 68). In order to measure the gain variations of the microactuator 22 relative to the magnitude of the first control signal 26, the amplitude ε of the sinusoid is set to a small value (block 70), the offset is initialized to zero (block 72), and the gain of the microactuator is measured (block 74). The offset is then adjusted (block 76) and the corresponding gain of the microactuator is measured (block 78) for a number of different offset values (block 80). A first polynomial function is then generated based on the measurements as described above with reference to equation (1) (block 82). In order to measure the gain variations of the microactuator 22 relative to the derivative of the first control signal 26, the offset is initialized to zero (block 84) and the amplitude ε of the sinusoid is adjusted (block 86) while measuring the gain of the microactuator for a number of different amplitude values (block 90). A second polynomial function is then generated based on the measurements as described above with reference to equation (2) (block 92). The function 30 in FIG. 2B for generating the adjustment signal $\Delta v_c$ is then generated based on the first and second functions (block 94) as described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
a head;
a disk surface comprising servo information;
a dual stage actuator (DSA) servo loop comprising a voice coil motor (VCM) servo loop comprising a VCM and a microactuator servo loop comprising a microactuator operable to actuate the head over the disk surface; and
control circuitry operable to:
generate a position error signal (PES) based on the servo information;
generate a first control signal based on the PES;
adjust the first control signal based on a function of the first control signal to generate a second control signal that compensates for a gain variation of the microactuator;
control the microactuator based on the second control signal; and
generate the function by injecting a disturbance signal into the microactuator servo loop, the disturbance signal comprising an offset and at least one sinusoid.

2. The disk drive as recited in claim 1, wherein the function compensates for a gain variation of the microactuator due to a magnitude of the first control signal.

3. The disk drive as recited in claim 1, wherein the control circuitry is further operable to generate the function by measuring a gain of the microactuator at a number of different values for the offset of the disturbance signal.

4. The disk drive as recited in claim 3, wherein the control circuitry is further operable to generate the function by maintaining a substantially constant amplitude of the sinusoid while measuring the gain of the microactuator across the different values for the offset of the disturbance signal.

5. The disk drive as recited in claim 1, wherein the function of the first control signal comprises a polynomial comprising a plurality of coefficients.

6. A method of operating disk drive comprising a head, a disk surface comprising servo information, and a dual stage actuator (DSA) servo loop comprising a voice coil motor (VCM) servo loop comprising a VCM and a microactuator servo loop comprising a microactuator operable to actuate the head over the disk surface, the method comprising:
generating a position error signal (PES) based on the servo information;
generating a first control signal based on the PES;
adjusting the first control signal based on a function of the first control signal to generate a second control signal that compensates for a gain variation of the microactuator;
controlling the microactuator based on the second control signal; and
generating the function by injecting a disturbance signal into the microactuator servo loop, the disturbance signal comprising an offset and at least one sinusoid.

7. The method as recited in claim 6, wherein the function compensates for a gain variation of the microactuator due to a magnitude of the first control signal.

8. The method as recited in claim 6, further comprising generating the function by measuring a gain of the microactuator at a number of different values for the offset of the disturbance signal.

9. The method as recited in claim 8, further comprising generating the function by maintaining a substantially constant amplitude of the sinusoid while measuring the gain of the microactuator across the different values for the offset of the disturbance signal.

10. The method as recited in claim 6, wherein the function of the first control signal comprises a polynomial comprising a plurality of coefficients.

11. A disk drive comprising:
a head;
a disk surface comprising servo information;
a dual stage actuator (DSA) servo loop comprising a voice coil motor (VCM) servo loop comprising a VCM and a microactuator servo loop comprising a microactuator operable to actuate the head over the disk surface; and
control circuitry operable to:
generate a position error signal (PES) based on the servo information;
generate a first control signal based on the PES;
adjust the first control signal based on a function of the first control signal to generate a second control signal that compensates for a gain variation of the microactuator; and
control the microactuator based on the second control signal;
wherein the function compensates for a gain variation of the microactuator due to a derivative of the first control signal.

12. The disk drive as recited in claim 11, wherein the control circuitry is further operable to generate the function by injecting a disturbance signal into the microactuator servo loop, the disturbance signal comprising at least one sinusoid.

13. The disk drive as recited in claim 12, wherein the control circuitry is further operable to generate the function by measuring a gain of the microactuator at a substantially zero position offset of the microactuator.

14. The disk drive as recited in claim 13, wherein the control circuitry is further operable to generate the function by measuring the gain of the microactuator at a number of different amplitudes for the sinusoid.

15. A method of operating disk drive comprising a head, a disk surface comprising servo information, and a dual stage actuator (DSA) servo loop comprising a voice coil motor (VCM) servo loop comprising a VCM and a microactuator servo loop comprising a microactuator operable to actuate the head over the disk surface, the method comprising:
generating a position error signal (PES) based on the servo information;
generating a first control signal based on the PES;
adjusting the first control signal based on a function of the first control signal to generate a second control signal that compensates for a gain variation of the microactuator; and
controlling the microactuator based on the second control signal;
wherein the function compensates for a gain variation of the microactuator due to a derivative of the first control signal.

16. The method as recited in claim 15, further comprising generating the function by injecting a disturbance signal into the microactuator servo loop, the disturbance signal comprising at least one sinusoid.

17. The method as recited in claim 16, further comprising generating the function by measuring a gain of the microactuator at a substantially zero position offset of the microactuator.

18. The method as recited in claim 17, further comprising generating the function by measuring the gain of the microactuator at a number of different amplitudes for the sinusoid.

* * * * *